Figure 1:
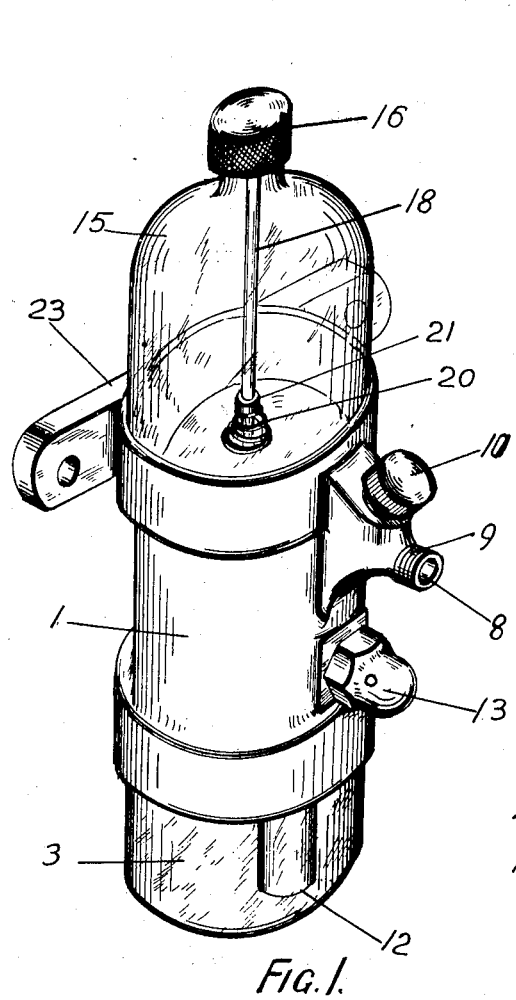

Oct. 15, 1929.   B. EDKINS ET AL   1,732,123
LUBRICATING DEVICE FOR INTERNAL COMBUSTION ENGINES
Filed Dec. 2, 1927

Patented Oct. 15, 1929

1,732,123

UNITED STATES PATENT OFFICE

BOYD EDKINS AND FREDERICK GEORGE BROWN, OF SYDNEY, NEW SOUTH WALES, AUSTRALIA

LUBRICATING DEVICE FOR INTERNAL-COMBUSTION ENGINES

Application filed December 2, 1927, Serial No. 237,260, and in Australia August 24, 1927.

This invention relates to the method of supplying lubricant to the firing chamber or chambers of an internal combustion engine, which consists in introducing into the induction pipe a small proportion of oil in a fine state of division mixed with air which is drawn into the cylinder with the explosive gaseous charge but in insufficient quantity to unduly weaken the latter.

A known device for this purpose consists of a vessel containing a supply of oil and providing an air space above the oil, said air space being connected by a small pipe fitted with a control valve to the inlet pipe of the engine, while an air inlet pipe admits air to the lower part of the body of oil. Under the influence of engine suction, air is drawn into and up through the body of oil in the form of bubbles which on issuing into the air space carry films of oil. These bubbles burst and the oil being disseminated in the form of mist through the air is drawn therewith into the engine.

It is found that the efficiency of this device is diminished as the oil level in the vessel recedes. This may be due to either or both of two causes. As the oil level recedes, the bubbles of air have a shorter passage through the oil and the quantity of oil picked up by them may therefore be less, while the depth of the air space being increased, the oil disseminated by the bursting of the bubbles may redeposit on the surface of the oil instead of being carried into the engine with the air. It appears that the efficiency of this device relies on the fact that in the air space a region of turbulence exists, but if the air space is unduly increased the turbulence is insufficient to maintain for sufficient time the admixture of air and oil mist so that the latter resettles on the body of oil. To restore to some extent the efficiency of the device adjustment of the control valve is necessary, and the comparatively frequent attention required in this regard is both inconvenient and annoying.

The object of our invention is to provide a device of the nature and for the purpose hereinbefore described, in which the level of the body of oil is maintained practically constant while there remains a supply of oil in a reservoir chamber forming part of the device, thus avoiding those fluctuations in efficiency which are inherent in the device above described.

This object is achieved by the provision of an oil reservoir chamber and a service chamber, the flow of oil from one to the other being controlled by an air lock, and means for regulating the air lock.

Our invention consists in a device comprising a novel combination of parts arranged to operate and coact as hereinafter described and illustrated in the accompanying drawings which depict our invention in the preferred and most compact form, it being understood that the actual construction and arrangement of the parts may be altered to suit various conditions or circumstances without departing from the scope of the invention as defined by the appended claiming clauses.

Figure 2:
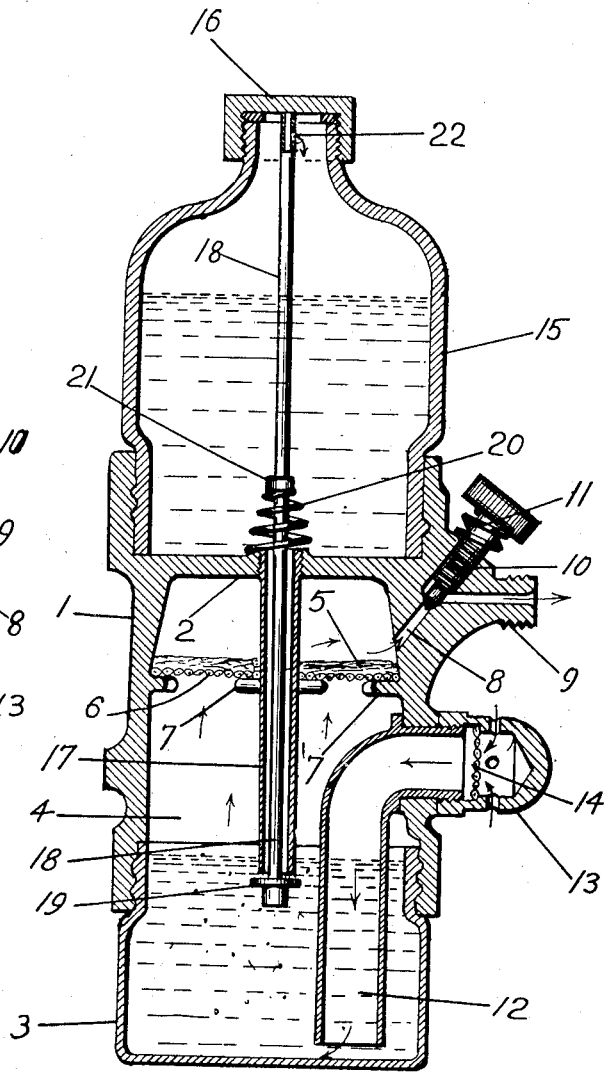
Figure 3:
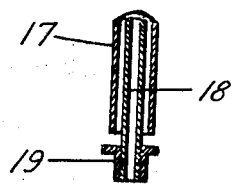

In the drawings Fig. 1 is a perspective view of the device, Fig. 2 a vertical sectional elevation thereof, and Fig. 3 a detail in sectional elevation.

The device comprises a shell 1 formed with a horizontal partition 2 but open at its lower end in which is screwed and cemented a vessel 3. The space enclosed by the shell 1 and vessel 3 constitutes the service chamber 4 and in it is a filter pad 5 of porous material supported on a disc of wire gauze 6 which rests upon internal lugs 7, 7.

An outlet passage 8 communicates at its inner end with the service chamber 4 above the pad 5, its outer end extending through a boss 9 which is screw threaded for coupling to a tube (not shown) connected at its other end to the induction pipe of an engine (also not shown). This outlet passage 8 is controlled by a regulating valve 10 frictionally held in adjusted position by a spring 11.

Below the pad 5 is the air inlet consisting of a curved tube 12 the lower and inner end of which approaches the bottom of the vessel 3 while its other end which passes through the shell 1 is fitted with a hollow perforated cap 13 containing an air filter 14 of gauze or the like.

Screwed and cemented into the upper portion of the shell 1 is a vessel 15 constituting the reservoir, shaped and threaded to receive a removable cap 16 making an air tight joint when screwed on.

Fitted in the centre of the partition 2 and making fluid tight joint therewith is an oil communication tube 17 depending into the service chamber 4 and passing through the pad 5 and gauze disc 6. Passing axially through the tube 17 is an air-pressure balancing tube 18 carrying on its open lower end a valve 19, said tube 18 being urged upwardly to seat the valve on the end of tube 17 by a spring 20 located between the partition 2 and a collar 21 on tube 18. The upper end of the tube 18 abuts against the underside of the cap 16 and holds the valve 19 away from its seat on the end of tube 17 while the device is operating as hereinafter explained. To avoid the possibility of the cap 16 sealing the upper end of tube 18, the latter is formed with a vent 22.

The shell 1 has a bracket 23 for fixing the device on any convenient support.

In the preferred form of the device the vessels 3 and 15 are made of glass, and in Fig. 1 these parts are shown as transparencies.

In initially charging the device the cap 16 is removed and the tube 17 pressed downwardly to remove valve 19 from its seat. Oil is then poured in to vessel 15 and it gravitates through tube 17 into the service chamber 4; when the oil level in the service chamber has risen sufficiently to submerge the lower end of tube 17, the tube 18 is released to permit valve 19 to re-seat. Additional oil poured into the vessel 15 accumulates therein until the latter is charged to nearly full capacity whereupon the cap 16 is replaced. The device is then ready for use, and, being coupled to the engine as before described and with regulating valve 10 open, the operation is as follows:—

The engine being started its suction produces a reduction of air pressure in the service chamber 4 and atmospheric air entering through inlet tube 12 bubbles up through the oil. On entering the region of reduced pressure above the oil, the air bubbles which carry a film of oil burst and disseminate the oil in the form of a mist which is drawn through the filter pad 5 and through outlet passage 8 to the engine induction pipe. The filter pad 5 eliminates any larger globules of oil which may form.

As the result of the drawing off of the oil mist the level of oil in chamber 4 tends to gradually recede but is maintained fairly constant by oil from reservoir 15 flowing down tube 17 for so long as the air pressure therein is not less than the negative pressure in chamber 4. There comes a time however when, owing to the level of oil in reservoir 15 receding, the air pressure in the latter is less than that in chamber 4, and oil does not flow down tube 17. The result is that the level of oil in chamber 4 recedes until the lower end of tube 17 is uncovered. It is found that, contrary to expectation, there is reluctance on the part of air under negative pressure in chamber 4 to pass up through the column of oil in tube 17 and through the body of oil in chamber 15 to restore the balance of pressure. It is at this stage that pressure-balancing tube 18 becomes effective. As the oil level in chamber 4 further recedes it ultimately uncovers the lower end of tube 18 so that there is provided a clear and unrestricted passage for air to establish a balance of pressure in reservoir 15 and chamber 4. When this balance is established oil from reservoir 15 will flow down tube 17 to raise the level of oil in chamber 4 and again submerge the end of tube 18, until the air pressure in reservoir 15 again becomes less than that in chamber 4 whereupon the flow ceases. When the oil level in chamber 4 has again receded sufficiently to expose the lower end of tube 18, the balance of pressure is again established and replenishing oil flows from reservoir 15.

Thus the oil in service chamber 4 is maintained at practically constant level under normal working conditions, the fluctuations, between submergence and exposure of the lower end of tube 18, being so slight as to be negligible. The desired result is obtained without the employment of a float or other moving contrivance or mechanism likely to wear or become ineffective through vibration.

What we claim and desire to secure by Letters Patent is:—

1. A lubricator for internal combustion engines of the type in which by the suction of the engine air is drawn in the form of bubbles through a body of oil in a service chamber having an outlet passage communicating with its upper portion and an air inlet to admit air to its lower portion to produce an oil mist or an oil (in a fine state of division) and air mixture which is drawn into the engine induction pipe, including an air tight oil reservoir chamber, an oil communication tube connected to the lower portion of said reservoir chamber and extending downwardly into the service chamber, a valve seating on the lower end of said tube, means urging the valve to its seat, releasable means for holding the valve off its seat, and an air-pressure balancing tube connecting the service chamber with the upper portion of the reservoir chamber and establishing free communication between them when the oil level in the service chamber falls below its lower end.

2. A lubricator for internal combustion engines, including a service chamber to hold a body of oil having a valved outlet passage communicating with its upper portion and an air inlet passage to admit air to its lower portion, a reservoir chamber mounted on the top of said service chamber and fitted with a removable cap, an oil communication tube having its upper end opening into the bottom of said reservoir chamber, the tube extending downwardly into the service chamber, an air pressure balancing tube passing axially through the oil communication tube and upwardly pressed by a spring to abut at its top end against the underside of the cap of the reservoir chamber, and a valve carried on the lower end of said balancing tube to close the lower end of the communication tube when the said cap is removed, all combined arranged and operating as and for the purpose set forth.

3. A lubricator for internal combustion engines comprising a cylindrical shell divided by a transverse partition and having in its wall below the partition a valved outlet passage and an air inlet port fitted with an air filter, a hollow vessel fixed to the lower end of said shell, a downturned tube connected to said air port and terminating near the bottom of said vessel, a second hollow vessel fixed to the other end of the shell and having a removable cap, a tube open at both ends fixed in said partition and extending downwardly therefrom, a smaller tube passing axially through the first mentioned tube, a spring urging the smaller tube upwardly to abut against the cap on the second mentioned vessel, and a valve carried by the lower end of said smaller tube, said valve being normally spaced from the lower end of the larger tube but seating thereon when on removal of the aforesaid cap the smaller tube is moved upwardly by the spring, all combined, arranged and operating as and for the purpose set forth.

Signed at Sydney, New South Wales, this first day of November A. D. 1927.

BOYD EDKINS.
FREDERICK GEORGE BROWN.